(12) United States Patent
Gong (10) Patent No.: US 12,230,246 B2
(45) Date of Patent: Feb. 18, 2025

(54) SPEECH RECOGNITION METHOD, SPEECH RECOGNITION DEVICE, AND ELECTRONIC EQUIPMENT

(71) Applicant: BEIJING HORIZON ROBOTICS TECHNOLOGY RESEARCH AND DEVELOPMENT CO., LTD., Beijing (CN)

(72) Inventor: Yichen Gong, Beijing (CN)

(73) Assignee: BEIJING HORIZON ROBOTICS TECHNOLOGY RESEARCH AND DEVELOPMENT CO., LTD., Beijing (CN)

( * ) Notice: Subject to any disclaimer, the term of this patent is extended or adjusted under 35 U.S.C. 154(b) by 246 days.

(21) Appl. No.: 17/501,181

(22) Filed: Oct. 14, 2021

(65) Prior Publication Data

US 2022/0115002 A1   Apr. 14, 2022

(30) Foreign Application Priority Data

Oct. 14, 2020   (CN) .......................... 202011098653.X (51) Int. Cl.
*G10L 15/02*   (2006.01)
*G06V 40/16*   (2022.01)
(Continued)

(52) U.S. Cl.
CPC ............ *G10L 15/02* (2013.01); *G06V 40/171* (2022.01); *G10L 15/25* (2013.01); *G10L 25/78* (2013.01); *G10L 2015/025* (2013.01)

(58) Field of Classification Search
CPC ......... G10L 15/02; G10L 15/25; G10L 25/78; G10L 2015/025; G06V 40/171; G06F 18/00; G09B 5/06
See application file for complete search history.

(56) References Cited

U.S. PATENT DOCUMENTS 6,216,267 B1 *   4/2001   Mitchell ................ H04N 19/00
                                                                         382/210
6,366,885 B1 *   4/2002   Basu ...................... G11B 27/10
                                                                         704/E21.02

(Continued)

FOREIGN PATENT DOCUMENTS

CN   101101752 A        1/2008
CN   101937268 A  *   1/2011   ......... G06K 9/00221
(Continued)

*Primary Examiner* — Richemond Dorvil
*Assistant Examiner* — Nadira Sultana
(74) *Attorney, Agent, or Firm* — Brooks Kushman P.C.

(57) ABSTRACT

Disclosed are a speech recognition method and device, and an electronic equipment. In the speech recognition method, when a user performs speech input, the lip of the user may be shot while audio is collected, then a second lip region of the user in a current frame image is obtained based on the current frame image and at least one first lip region in a historical frame image; concurrently, a second speech feature of current frame audio may be obtained based on current frame audio and at least one first speech feature of historical frame audio. Then, the phoneme probability distribution of the current frame audio may be obtained according to the speech features and the lip regions, and then the speech recognition result of the current frame audio may be obtained according to the phoneme probability distribution.

18 Claims, 6 Drawing Sheets

(51) Int. Cl.
  *G10L 15/25*   (2013.01)
  *G10L 25/78*   (2013.01)

(56) References Cited

U.S. PATENT DOCUMENTS

| | | | | |
|---|---|---|---|---|
| 6,964,023 | B2* | 11/2005 | Maes | G06F 3/0481 |
| | | | | 704/E15.041 |
| 7,133,535 | B2* | 11/2006 | Huang | G06V 40/20 |
| | | | | 704/E21.02 |
| 10,388,272 | B1* | 8/2019 | Thomson | G10L 15/22 |
| 10,789,343 | B2* | 9/2020 | Li | G06F 21/32 |
| 11,663,307 | B2* | 5/2023 | Uzun | G06F 21/32 |
| | | | | 713/186 |
| 2003/0018475 | A1 | 1/2003 | Basu et al. | |
| 2011/0261257 | A1* | 10/2011 | Terry | H04N 21/234318 |
| | | | | 348/E9.034 |
| 2020/0097643 | A1* | 3/2020 | Uzun | G06V 40/40 |
| 2020/0218916 | A1 | 7/2020 | Wu et al. | |

FOREIGN PATENT DOCUMENTS

| | | | | |
|---|---|---|---|---|
| CN | 105681920 A | * | 6/2016 | G09B 5/06 |
| JP | 4631078 B2 | * | 2/2011 | |
| WO | WO-2014125736 A1 | * | 8/2014 | G10L 15/04 |

* cited by examiner

SPEECH RECOGNITION METHOD, SPEECH RECOGNITION DEVICE, AND ELECTRONIC EQUIPMENT

CROSS-REFERENCE TO RELATED APPLICATIONS

This application claims the benefit and priority to Chinese patent application No. 202011098653.X filed on Oct. 14, 2020, the disclosures of which are hereby incorporated in its entirety by reference herein.

TECHNICAL FIELD

The present disclosure relates to the field of speech recognition technology, and in particular, relates to a speech recognition method, a speech recognition device, and an electronic equipment.

BACKGROUND

Along with the advancement of the data processing technology and the rapid popularization of mobile Internet, the computer technology has been widely used in various fields of society, and along with it is the generation of mass data. The speech data has attracted more and more attention. Speech recognition technology, also known as automatic speech recognition (ASR), aims to convert lexical content of human speech into computer-readable input, such as key, binary codes, or character sequences, and the like.

SUMMARY

In related technologies, a speech recognition solution usually includes the following steps: speech signal noise reduction, feature extraction, phoneme classification and decoding. However, the speech recognition of this kind of speech recognition solution is less effective in a high noise (i.e. low signal-to-noise ratio) scene.

The present disclosure is proposed in order to solve the above-mentioned technical problem. Embodiments of the present disclosure provide a speech recognition method, a speech recognition device, and an electronic equipment.

An embodiment of the first aspect of the present disclosure provides a speech recognition method comprising: obtaining a video stream and an audio stream within a preset time period, the video stream within the preset time period including a current frame image and a historical frame image before the current frame image, the audio stream within the preset time period including current frame audio and historical frame audio before the current frame audio; obtaining at least one first lip region of a user in the historical frame image, and determining a second lip region of the user in the current frame image based on the current frame image and the at least one first lip region; and obtaining at least one first speech feature of the historical frame audio, and obtaining a second speech feature of the current frame audio based on the current frame audio and the at least one first speech feature, wherein the second lip region in the current frame image corresponds to the second speech feature; obtaining a phoneme probability distribution of the current frame according to the at least one first lip region, the second lip region, the at least one first speech feature, and the second speech feature; obtaining a speech recognition result of the current frame audio according to the phoneme probability distribution.

In the above mentioned speech recognition method, when the user inputs a speech, the lip of the user may be shot while audio is collected, and then a second lip region of the user in the current frame image is obtained based on at least one first lip region of the current frame image and the historical frame image; in parallel, the second speech feature of the current frame audio may be obtained based on at least one first speech feature of the current frame audio and the historical frame audio. Then, the phoneme probability distribution of the current frame may be obtained according to the above speech features and the above lip regions, and then the speech recognition result of the current frame audio may be obtained according to the phoneme probability distribution, so that the speech recognition may be performed by combining the lip regions of the video with the speech features of the audio, and the recognition effect of the speech recognition under a noise scene is greatly improved.

An embodiment of the second aspect of the present disclosure provides a speech recognition device, comprising: an acquisition module, which is used for obtaining a video stream and an audio stream within a preset time period, the video stream within the preset time period including a current frame image and a historical frame image before the current frame image, the audio stream within the preset time period including current frame audio and historical frame audio before the current frame audio; obtaining at least one first lip region of a user in the historical frame image, and determining a second lip region of the user in the current frame image based on the current frame image and the at least one first lip region; and obtaining at least one first speech feature of the historical frame audio, and obtaining a second speech feature of the current frame audio based on the current frame audio and the at least one first speech feature, wherein the second lip region in the current frame image corresponds to the second speech feature; a recognition module, which is used for obtaining a phoneme probability distribution of the current frame according to the at least one first lip region, the second lip region, the at least one first speech feature and the second speech feature; and a decoding module, which is used for obtaining a speech recognition result of the current frame audio according to the phoneme probability distribution.

An embodiment of the third aspect of the present disclosure provides a computer-readable storage medium, the computer-readable storage medium storing a computer program used for executing the speech recognition method provided in the first aspect.

An embodiment of the fourth aspect of the present disclosure provides an electronic equipment, comprising: a processor; a memory for storing an instruction executable by the processor; wherein the processor is used for reading the executable instruction from the memory, and executing the instruction to implement the speech recognition method in the above mentioned first aspect.

It should be understood that the technical solutions of the embodiments of the second aspect to the fourth aspect of the present disclosure are consistent with the technical solution of the embodiment of the first aspect of the present disclosure, and the beneficial effect obtained in all aspects and corresponding feasible implementation are similar, and will not be repeated.

BRIEF DESCRIPTION OF THE DRAWINGS

The above and other objects, features and advantages of the present disclosure will become more apparent by describing embodiments of the present disclosure in more detail combined with accompanying drawings. The accompanying drawings are configured to provide a further understanding of the embodiments of the present disclosure, and constitute a part of the specification to explain the present disclosure together with the embodiments of the present application, not constituting a limitation of the present application. In the accompanying drawings, the same reference signs usually represent the same components or steps.

DETAILED DESCRIPTION

Hereafter, exemplary embodiments according to the present disclosure will be described in detail with reference to the accompanying drawings. Obviously, the described embodiments are merely a part but not all of the present disclosure. It should be understood that the present disclosure is not limited by the exemplary embodiments described herein.

The speech recognition of the speech recognition solution provided by the existing related technology is less effective in a high noise (i.e. low signal-to-noise ratio) scene, and in order to solve this problem, the embodiments of the present disclosure provide a speech recognition method, which combines speech and video sequence double-channel information as input, constructs an acoustic model, and thus greatly improves the recognition effect of speech recognition under a noise scene.

Figure 1:
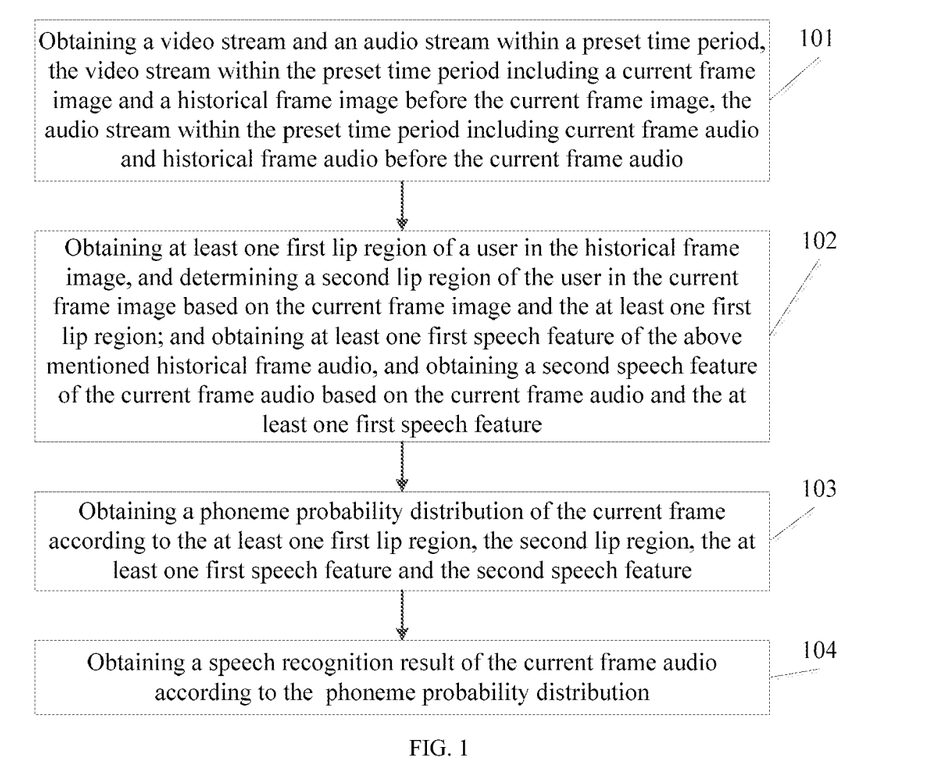
FIG. 1 is a flowchart of a speech recognition method provided by an exemplary embodiment of the present disclosure.

FIG. 1 is a flowchart of a speech recognition method provided by an exemplary embodiment of the present disclosure. As shown in FIG. 1, the above-mentioned speech recognition method may include the following steps.

In step S101, a video stream and an audio stream within a preset time period is obtained, wherein the video stream within the above mentioned preset time period includes a current frame image and a historical frame image before the current frame image, and the audio stream within the above mentioned preset time period includes current frame audio and historical frame audio before the current frame audio.

In step S102, at least one first lip region of a use in the above mentioned historical frame image is obtained, and a second lip region of the user in the current frame image is determined based on the current frame image and the at least one first lip region; and at least one first speech feature of the above mentioned historical frame audio is obtained, and a second speech feature of the current frame audio is obtained based on the current frame audio and the at least one first speech feature.

The second lip region in the current frame image corresponds to the second speech feature, and specifically, the second lip region corresponding to the second speech feature may be as follows: the second lip area is obtained from the current frame image, and the second speech feature is a speech feature of the audio which is captured when the current frame image is shot.

Specifically, determining the second lip region of the user in the current frame image based on the above mentioned current frame image and the at least one first lip region may be as follows: performing face detection on the current frame image, and locating a face region of the user, then, performing lip detection on the face region of the above mentioned user according to the at least one first lip region, locating the second lip region of the above mentioned user in the current frame image, and intercepting the second lip region from the current frame image.

Further, after intercepting the second lip region from the current frame image, the picture size of the second lip region may be interpolated and changed to a specified size and may be cached.

It may be understood that in a case where the historical frame is the current frame, at least one first lip region in the historical frame image is obtained in the same way as described above.

Specifically, obtaining the second speech feature of the current frame audio based on the current frame audio and the at least one first speech feature may be as follows: performing signal processing on the current frame audio to reduce noise in the current frame audio, then, performing feature extraction on the current frame audio according to the at least one first speech feature, and obtaining the above mentioned second speech feature of the current frame audio.

In specific implementation, a noise reduction algorithm, such as an adaptive filter, spectral subtraction, or a Wiener filter algorithm and the like, may be used for performing signal processing on the above mentioned current frame audio to reduce the noise in the current frame audio. In a case of performing feature extraction, short time Fourier transform may be performed on the waveform data of the current frame audio after noise reduction to obtain a spectral feature, and then the spectral feature may be saved as the speech feature of the current frame audio. Alternatively, algorithms, such as Mel frequency cepstrum coefficient (MFCC) or filter banks (Fbank) and the like, may be used for performing feature extraction on the above-mentioned spectrum feature to obtain the above-mentioned speech feature of the current frame audio.

It may be understood that the at least one first speech feature of the historical frame audio is also obtained in the way as described above in a case where the historical frame is the current frame.

In step S103, a phoneme probability distribution of the current frame is obtained according to the at least one first lip region, the second lip region, the at least one first speech feature and the second speech feature.

The phoneme is the smallest speech unit divided according to the natural attributes of speech. From the perspective of acoustic properties, the phoneme is the smallest speech unit divided from the perspective of sound quality. From the perspective of physiological properties, one pronunciation action forms one phoneme, for example: [ma] includes two pronunciation actions, i.e. [m] [a], which are two phonemes.

In the present embodiment, the at least one first lip region corresponds to the at least one first speech feature, and the second lip region corresponds to the second speech feature. In specific implementation, the at least one first lip region and the second lip region may be matched respectively with the at least one first speech feature and the second speech feature in a time dimension after feature extraction, then the first lip region, the second lip region, the first speech feature, and the second speech feature may be input into a neural network model together for performing prediction, the first lip region, the second lip region, the first speech feature, and the second speech feature are performed feature fusion in the neural network model, and features obtained after the feature fusion are recognized using the neural network model, then the phoneme probability distribution of the current frame may be obtained.

In step S104, a speech recognition result of the current frame audio is obtained according to the above-mentioned phoneme probability distribution.

Specifically, obtaining the speech recognition result of the current frame audio according to the above mentioned phoneme probability distribution may be as follows: performing recognition through a decoder according to the phoneme probability distribution, and obtaining the speech recognition result of the current frame audio.

In specific implementation, the recognition may be performed by using a decoder based on dynamic planning search or a decoder based on beam search, according to the above mentioned phoneme probability distribution, to obtain the speech recognition result of the current frame audio.

In the above mentioned speech recognition method, when a user performs speech input, the lip of the user may be shot while audio is collected, and then the second lip region of the user in the current frame image is obtained based on the at least one first lip region of the current frame image and the historical frame image; in parallel, the second speech feature of the current frame audio may be obtained based on the at least one first speech feature of the current frame audio and the historical frame audio. Then, the phoneme probability distribution of the current frame may be obtained according to the above speech features and the above lip regions, and then the speech recognition result of the current frame audio may be obtained according to the phoneme probability distribution, so that the speech recognition may be carried out by combining the lip regions of the video with the speech features of the audio, and the recognition effect of the speech recognition under a noise scene is greatly improved.

Figure 2:
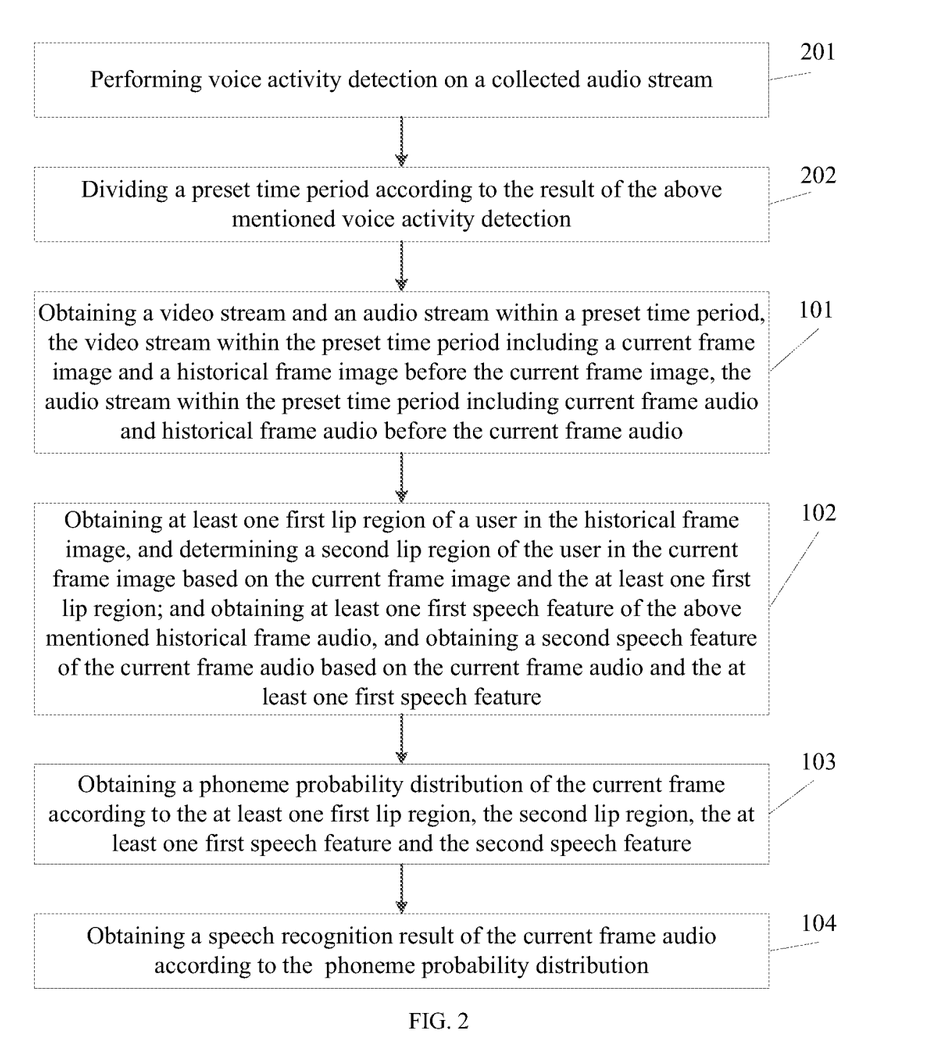
FIG. 2 is a flowchart of a speech recognition method provided by another exemplary embodiment of the present disclosure.

FIG. 2 is a flowchart of a speech recognition method provided by another exemplary embodiment of the present disclosure. As shown in FIG. 2, in the embodiment shown in FIG. 1 of the present disclosure, before step S101, it may further include:

Step S201: performing voice activity detection on the collected audio stream.

Specifically, the voice activity detection (VAD) is generally used for identifying speech presence and speech absence in audio signals.

Generally speaking, VAD may include the following steps: 1) performing frame processing on the audio signal; 2) extracting features from each frame of data; 3) training a classifier on a set of data frames of a known speech and silent signal region; 4) classifying unknown framing data by using the classifier trained in step 3) according to the features extracted in step 2), and determining whether it belongs to a speech signal or a silent signal.

Step S202: dividing a preset time period according to a result of the above mentioned voice activity detection.

Specifically, dividing the preset time period according to the result of the above mentioned voice activity detection may be as follows: obtaining an initial time point of each audio stream in the collected audio stream and a termination time point corresponding to the above mentioned initial time point from the result of the above mentioned voice activity detection; taking the above mentioned initial time point as an initial moment of the above mentioned preset time period, and taking the above mentioned termination time point as a termination moment of the above mentioned preset time period.

In the present embodiment, the voice activity detection is performed on the collected audio stream, and the preset time period is divided according to the result of the activity detection, thus in a case of performing speech recognition, the segmentation processing may be performed on the audio stream and the video stream, and the amount of data needed to be processed by the single speech recognition is greatly reduced, and the processing performance of the processor is improved.

Figure 3:
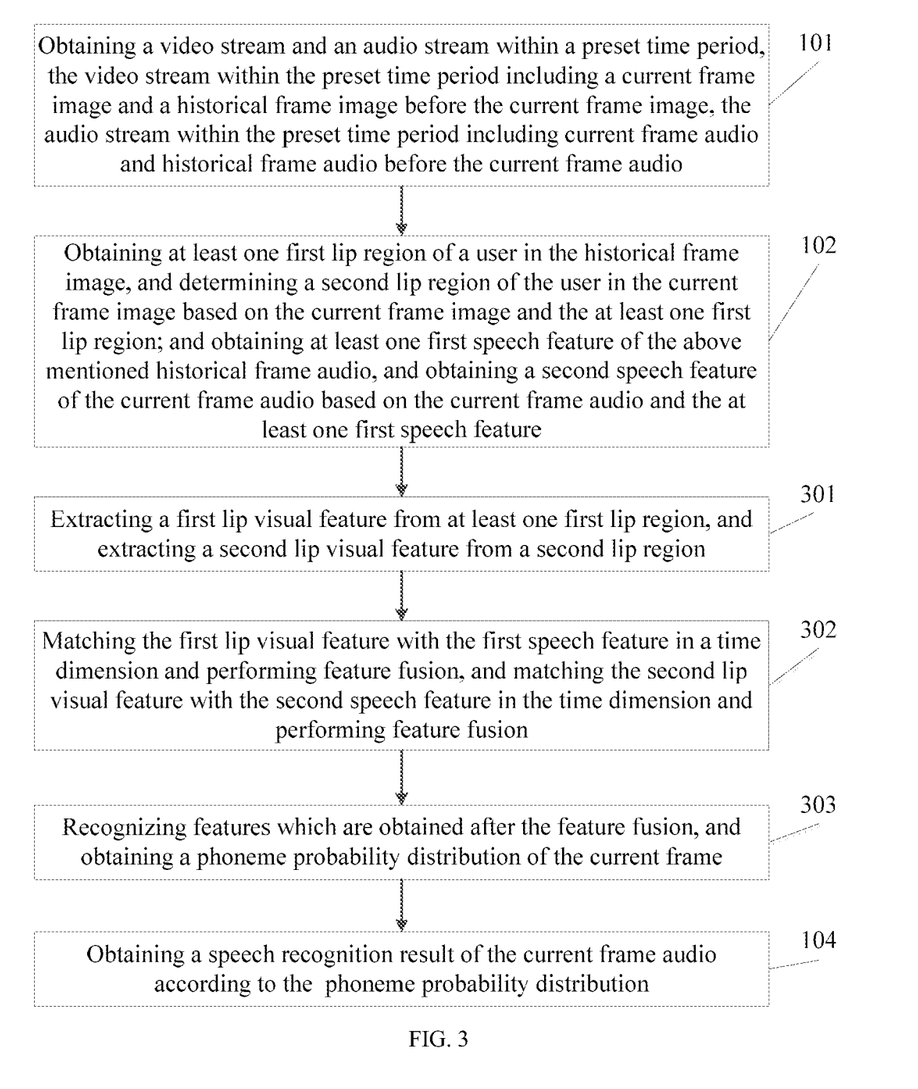
FIG. 3 is a flowchart of a speech recognition method provided by still another exemplary embodiment of the present disclosure.

FIG. 3 is a flowchart of a speech recognition method provided by still another exemplary embodiment of the present disclosure. As shown in FIG. 3, in the embodiment shown in FIG. 1 of the present disclosure, step S103 may include:

Step 301: extracting a first lip visual feature from the at least one first lip region, and extracting a second lip visual feature from the second lip region.

Specifically, one input lip region picture may be processed through the combination of a convolutional neural network and a pooling network, so that the dimensions of the input lip region picture are reduced in a spatial dimension and the dimensions of the input lip region picture are raised in a feature dimension, thus a lip visual feature is extracted from the above mentioned lip region.

The above mentioned lip visual features may be scale-invariant features transformation (SIFT) operator features, features extracted by a convolutional neural network and/or optical flow features, etc., and the specific types of the lip visual features are not limited in the present embodiment.

Step S302: matching the first lip visual feature with the first speech feature in a time dimension and performing feature fusion, and matching the second lip visual feature with the second speech feature in the time dimension and performing feature fusion.

Specifically, the above mentioned lip visual feature and the above mentioned speech feature may be performed the feature fusion through a solution such as feature splicing, weighted summation, gate fusion or attention fusion, and the like, and the solution used by the feature fusion is not limited in the present embodiment.

Step S303: recognizing features which are obtained after the feature fusion, and obtaining a phoneme probability distribution of the current frame.

Specifically, recognizing the features which are obtained after the feature fusion may be performed by using the combination of a convolutional neural network and a pooling network to obtain the phoneme probability distribution corresponding to the above mentioned lip regions.

In the present embodiment, in a case of performing speech recognition, the lip visual features and the speech features may be performed feature fusion, and then performing speech recognition by using the features which are obtained after the feature fusion, thus the recognition precision of the speech recognition under a noise scene may be improved.

Figure 4:
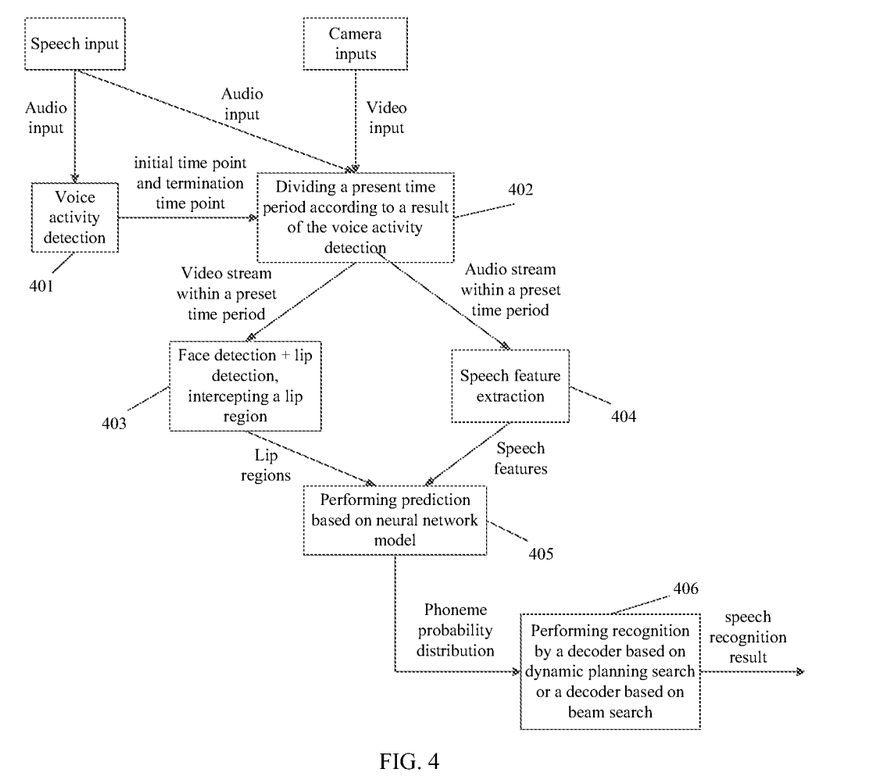
FIG. 4 is a flowchart of a speech recognition method provided by still another exemplary embodiment of the present disclosure.

FIG. 4 is a flowchart of a speech recognition method provided by still another exemplary embodiment of the present disclosure. As shown in FIG. 4, the above mentioned speech recognition method may include:

Step S401: performing voice activity detection on a collected audio stream.

Step S402: dividing a preset time period according to a result of the above mentioned voice activity detection; then, obtaining a video stream and an audio stream within the preset time period, the video stream within the above mentioned preset time period including a current frame image and a historical frame image before the current frame image, and the audio stream within the above mentioned preset time period including current frame audio and historical frame audio before the current frame audio.

Specifically, an initial time point of each audio stream in the collected audio stream and a termination time point corresponding to the above mentioned initial time point may be obtained from the result of the above mentioned voice activity detection; the above mentioned initial time point is taken as an initial moment of the above mentioned preset time period, and the above mentioned termination time point is taken as a termination moment of the above-mentioned preset time period.

Step S403: obtaining at least one first lip region of a user in the above mentioned historical frame image, and determining a second lip region of the user in the current frame image based on the current frame image and the at least one first lip region.

Step S404: obtaining at least one first speech feature of the above mentioned historical frame audio, and obtaining a second speech feature of the current frame audio based on the current frame audio and the at least one first speech feature.

In specific implementation, step S403 and step S404 may be executed in parallel or successively, and the execution sequence of step S403 and step S404 is not limited in the present embodiment.

Step S405: obtaining a phoneme probability distribution of the current frame according to the at least one first lip region, the second lip region, the at least one first speech feature and the second speech feature.

Specifically, the at least one first lip region, the second lip region, the at least one first speech feature, and the second speech feature may be input the combination of a convolutional neural network and a pooling network to obtain the phoneme probability distribution of the current frame.

Step 406: performing recognition by using a decoder based on dynamic planning search or a decoder based on beam search, and obtaining a speech recognition result of the current frame audio, according to the above mentioned phoneme probability distribution.

Specifically, in implementation, in a case where recognition is performed by using a decoder based on a dynamic programming search, a dynamic decoding network only compiles a dictionary into a state network to form a search space. The general process of compilation is as follows: firstly, connecting all words in the dictionary in parallel to form a parallel network; then replacing the words with a phoneme string; subsequently, splitting each phoneme into a state sequence according to a context; finally, a beginning and an end of the state network is connected according to a principle of phoneme context consistency to form a loopback. The network compiled in this way is commonly referred to as a linear dictionary, the characteristic of which is that the state sequence of each word is kept strictly independent and there is no node sharing between the states of different words, therefore, the memory footprint is relatively large, and there are more repeated calculations in the decoding process.

In order to overcome these shortcomings, generally the parts with the same pronunciation at the beginning and the end of a word are combined, which is referred to as a tree dictionary. Dynamic decoding is performed in a search space formed by the tree dictionary, and if an N-gram language model is used, the identifier of a current word can only be known when the search reaches a leaf node of the tree. In this way, the probability of the language model can only be integrated after reaching the end state of the n-th word in the N-Gram. In order to be able to apply dynamic programming criteria, a common practice is to organize the search space in a "tree copy" way: for the history of each precursor word, a copy of the dictionary tree is introduced, so that in the search process, the history of the precursor word may be known when the hypothesis of the end of the word appears.

The decoding search based on the tree copy requires to use a dynamic programming (DP) algorithm. The main purpose of dynamic programming is to decompose the solution of a global optimal problem into small local problems and form recursive connections.

In another implementation, the core idea for recognition based on the decoder of the beam search is to track k most probable partial translations (which may be referred to as a hypotheses assumption, similar to a kind of pruning thought) at each step of the decoder, k is the size of a beam, and the size of k may be set by itself in specific implementation, for example, k may be a number from 5 to 10.

It is assumed that a target sentence being predicted by the decoder includes words y1, y2, . . . , yt. Each of y1, y2, . . . , yt has a score, i.e. the logarithmic probability of y1, y2, . . . , yt, wherein the scores are all negative numbers, and the higher the score, the better the score, then you can search for hypotheses with higher scores and track the top k translations at each step.

In the speech recognition method provided by the embodiments of the present disclosure, when a user inputs a speech, the lip of the user may be shot while the audio is collected, and then the second lip region of the user in the current frame image is obtained based on the at least one first lip region of the current frame image and the historical frame image; in parallel, the second speech feature of the current frame audio may be obtained based on the at least one first speech feature of the current frame audio and the historical frame audio. Then, the phoneme probability distribution of the current frame may be obtained according to the above speech features and the above lip regions, and then the speech recognition result of the current frame audio may be obtained according to the phoneme probability distribution, so that the speech recognition may be carried out by combining the lip regions of the video with the speech features of the audio, and the recognition effect of the speech recognition in a noise scene is greatly improved.

The speech recognition method provided by the embodiments of the present disclosure may be implemented by using a general-purpose processor, and it may also be implemented based on an embedded margin artificial intelligence (AI) chip, further it may also be implemented based on a cloud neural network accelerator, such as a graphics processing unit (GPU).

Figure 5:
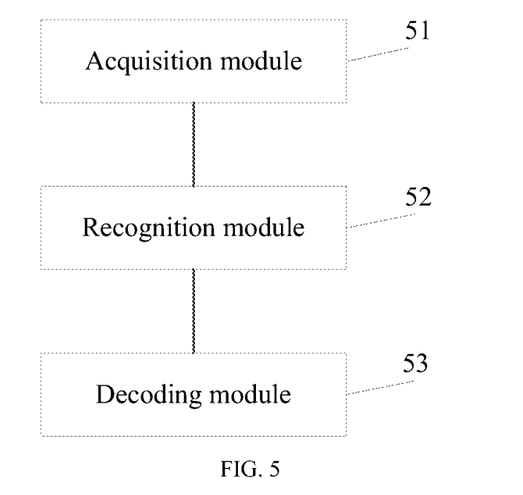
FIG. 5 is a schematic structural diagram of a speech recognition device provided by an exemplary embodiment of the present disclosure.

FIG. 5 is a schematic structural diagram of a speech recognition device provided by an exemplary embodiment of the present disclosure. As shown in FIG. 5, the above mentioned speech recognition device may include: an acquisition module 51, a recognition module 52, and a decoding module 53; wherein the acquisition module 51 is used for obtaining a video stream and an audio stream within a preset time period, the video stream within the above mentioned preset time period including a current frame image and a historical frame image before the current frame image, and the audio stream within the above mentioned preset time period including current frame audio and historical frame audio before the current frame audio; obtaining at least one first lip region of a use in the historical frame image, and determining a second lip region of the user in the current frame image based on the current frame image and the at least one first lip region; and obtaining at least one first speech feature of the historical frame audio, and obtaining a second speech feature of the current frame audio based on the current frame audio and the at least one first speech feature, wherein the second lip region in the current frame image corresponds to the second speech feature; the recognition module 52 is used for obtaining a phoneme probability distribution of the current frame according to the at least one first lip region, the second lip region, the at least one first speech feature, and the second speech feature; and the decoding module 53 is used for obtaining a speech recognition result of the current frame audio according to the phoneme probability distribution obtained by the recognition module 52.

The speech recognition device provided in the embodiment shown in FIG. 5 may be used for executing the technical solution of the method embodiment shown in FIG. 1 of the present disclosure, and for the implementation principle and technical effect thereof, the relevant description in the method embodiment may further be referred to.

Figure 6:
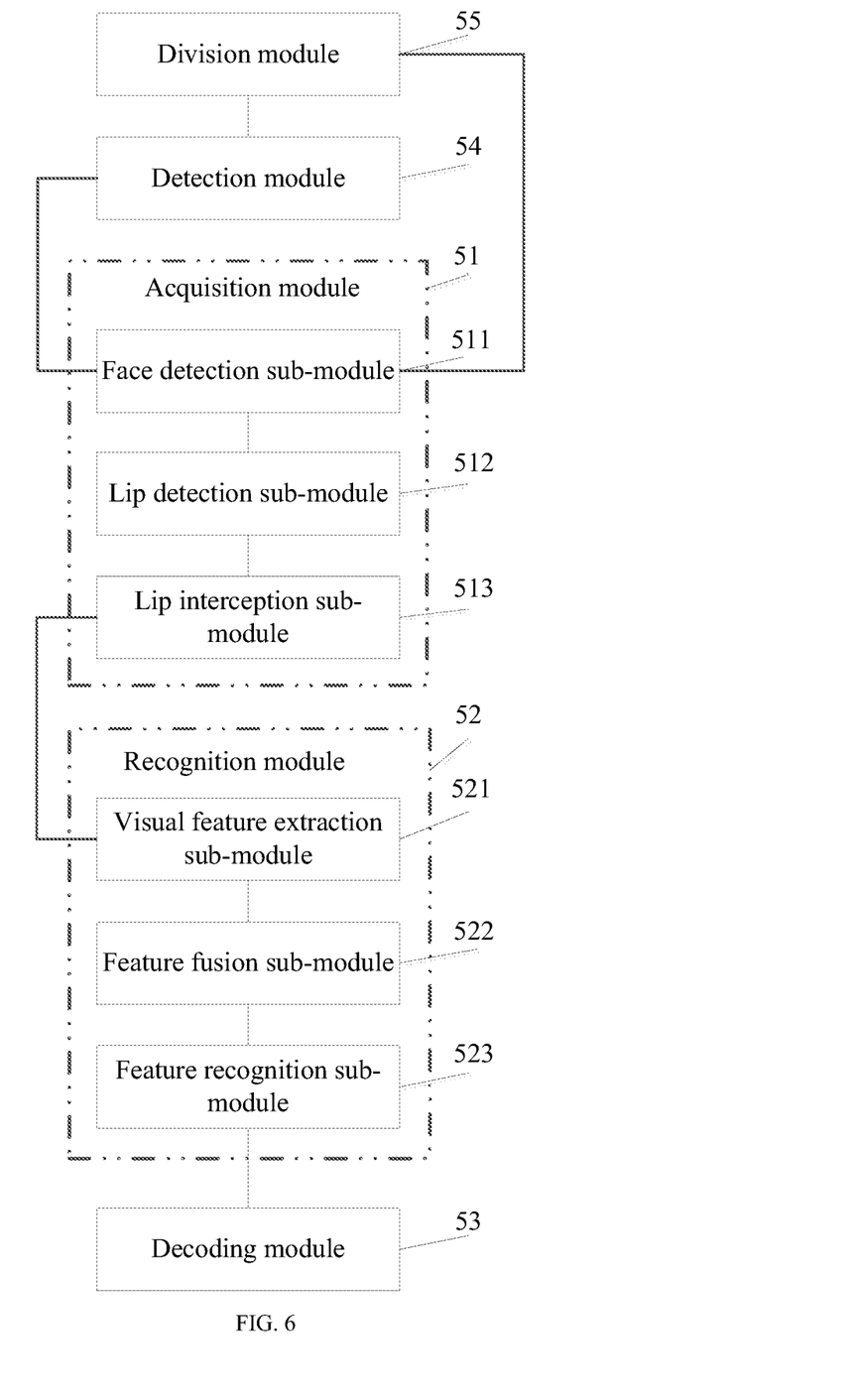
FIG. 6 is a schematic structural diagram of a speech recognition device provided by another exemplary embodiment of the present disclosure.

FIG. 6 is a schematic structural diagram of a speech recognition device provided by another exemplary embodiment of the present disclosure. And compared with the speech recognition device shown in FIG. 5, the difference lies in that the speech recognition device shown in FIG. 6 may further include: a detection module 54 and a division module 55; wherein the detection module 54 is used for performing voice activity detection on a collected audio stream before the acquisition module 51 obtains the video stream and the audio stream within the preset time period; and the dividing module 55 is used for dividing the above mentioned preset time period according to a result of the above mentioned voice activity detection.

Specifically, the dividing module 55 is used for obtaining an initial time point of each audio stream in the collected audio stream and a termination time point corresponding to the initial time point from the result of the voice activity detection; taking the above mentioned initial time point as an initial moment of the above mentioned preset time period, and taking the above mentioned termination time point as a termination moment of the above mentioned preset time period.

In the present embodiment, the acquisition module 51 may include: a face detection sub-module 511, a lip detection sub-module 512, and a lip interception sub-module 513; wherein the face detection sub-module 511 is used for performing face detection on the current frame image, and locating a face region of the above mentioned user; the lip detection sub-module 512 is used for performing lip detection on the face region of the above mentioned user according to the at least one first lip region, and locating the second lip region of the above mentioned user in the current frame image; and the lip interception sub-module 513 is used for intercepting the second lip region from the above mentioned current frame image.

In the present embodiment, the decoding module 53 is specifically used for performing recognition through a decoder according to the above mentioned phoneme probability distribution, and obtaining the speech recognition result of the current frame audio.

In the present embodiment, the recognition module 52 may include: a visual feature extraction sub-module 521, a feature fusion sub-module 522, and a feature recognition sub-module 523; wherein the visual feature extraction sub-module 521 is used for extracting a first lip visual feature from the at least one first lip region, and extracting a second lip visual feature from the second lip region; the feature fusion sub-module 522 is used for matching the first lip visual feature with the first speech feature in a time dimension and perform feature fusion, and matching the second lip visual feature with the second speech feature in the time dimension and perform feature fusion; and the feature recognition sub-module 523 is used for recognizing features which are obtained after feature fusion being performed to obtain the phoneme probability distribution of the current frame.

The speech recognition device provided in the embodiment shown in FIG. 6 may be used for executing the technical solution of the method embodiment shown in FIGS. 1 to 4 of the present disclosure, and for the implementation principle and technical effect thereof, the relevant description in the method embodiment may further be referred to.

Figure 7:
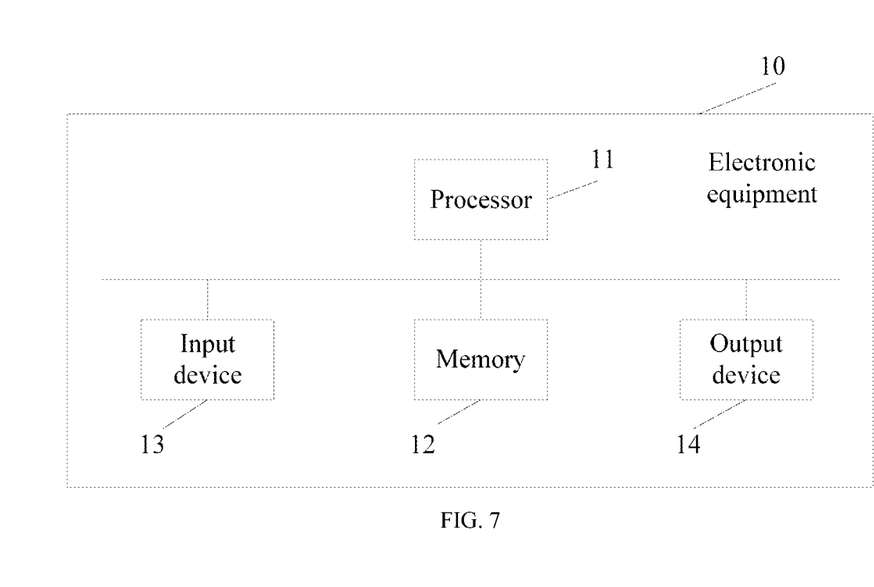
FIG. 7 is a schematic structural diagram of an electronic equipment provided by an exemplary embodiment of the present disclosure.

Hereinafter, an electronic equipment according to an embodiment of the present disclosure will be described with reference to FIG. 7. FIG. 7 is a schematic structural diagram of an electronic equipment provided by an exemplary embodiment of the present disclosure.

As shown in FIG. 7, an electronic equipment 10 may include one or more processors 11 and a memory 12.

The processor 11 may be a central processing unit (CPU) or other forms of processing units which is in other forms and has a data processing capability and/or an instruction execution capability, and may control other components in the electronic equipment 10 to execute expected functions.

The memory 502 may include one or more computer program products which may include various forms of computer readable storage medium, such as a volatile memory and/or a nonvolatile memory. The volatile memory may include, for example, a random access memory (RAM) and/or a cache, or the like. The nonvolatile memory may include, for example, a read-only memory (ROM), a hard disk, a flash memory, and the like. One or more computer program instructions may be stored in the computer readable storage medium, and the processor 11 may run the program instruction(s) to realize the speech recognition method and/or other expected functions of various embodiments of the present disclosure as described above. Various contents such as an input signal, a signal component, a noise component and the like may also be stored in the computer readable storage medium.

In an example, the electronic equipment 10 may further include an input device 13 and an output device 14 that are interconnected by a bus system and/or a connection mechanism in other forms (not shown).

In an embodiment of the present disclosure, the input device 13 may include a microphone and a camera, wherein the microphone is used for collecting audio, and the camera is used for shooting video.

In addition, the input device 13 may further include, for example, a keyboard and/or a mouse, and the like.

The output device 44 may output various information to the outside, including speech recognition results. The output device 14 may include, for example, a display, a speaker, a printer, a communication network and a remote output device connected thereto, and so on.

Certainly, for the sake of simplicity, only some of the components of the electronic equipment 10 related to the present disclosure are shown in FIG. 7, and components such as a bus, an input/output interface, and the like are omitted. In addition, the electronic equipment 10 may further include any other suitable components according to specific application situations.

In addition to the method, device and equipment described above, the embodiments of the present disclosure also provide a computer program product which includes a computer program instruction, and in a case where the computer program instruction is executed by a processor, the processor is made to execute the steps in the speech recognition method according to various embodiments of the present disclosure as described in the above section "Exemplary Methods" of the present specification.

The computer program product may program a program code for executing the operations of the embodiments of the present disclosure in any combination of one or more programming languages. The programming language includes an object-oriented programming language, such as Java, C++, and the like, and further includes a conventional procedural programming language, such as "C" language or similar programming languages. The program code may be executed entirely on a user computing device, be executed partially on a user device, be executed as a separate software package, be executed partially on the user computing device and partially on a remote computing device, or be executed entirely on the remote computing device or a server.

In addition, the embodiments of the present application also provide a computer readable storage medium having a computer program instruction stored thereon, and in a case where the computer program instruction is executed by a processor, the processor is made to execute the steps in the speech recognition method according to various embodiments of the present application as described in the above section "Exemplary Methods" of the present specification.

The computer readable storage medium may use any combination of one or more readable medium. The readable medium may be a readable signal medium or a readable storage medium. The readable storage medium may include, but not limited to, for example, electronic, magnetic, optical, electromagnetic, infrared or a semiconductor system, apparatus or device, or any combinations of the above. More specific examples (non-exhaustive list) of the readable storage medium may include an electrical connection having one or more wires, a portable disk, a hard disk, a Random Access Memory (RAM), a Read-Only Memory (ROM), an Erasable Programmable Read-Only Memory (EPROM or a Flash memory), an optical fiber, a Portable Compact Disc Read-Only Memory (CD-ROM), an optical storage device, a magnetic storage device, or any suitable combination of the above.

The basic principles of the present disclosure have been described above in connection with specific embodiments. However, it needs to be noted that merits, advantages, effects, and the like mentioned in the present disclosure are merely exemplary and not restrictive, and the merits, advantages, effects, and the like are not considered to be requisite in embodiments of the present disclosure. In addition, the specific details of the above application are only for the purpose of illustration and ease of understanding, and are not for a limiting purpose. The above details do not limit the present disclosure must be implemented with the above specific details.

The block diagrams of components, apparatuses, devices and systems mentioned in the present disclosure are merely exemplary examples, and not intended to require or imply that connection, arrangement and configuration must be performed in the manners shown in the block diagrams. As will be appreciated by those skilled in the art, these components, apparatus, devices and systems may be connected, arranged, and configured in any manner. Words such as "including", "comprising", "having", and the like are open-ended words, referring to "including but not limited to", and may be used therewith interchangeably. The word "or" and "and" used herein refer to a word "and/or," and may be used therewith interchangeably unless the context indicates otherwise clearly. The word "such as" used herein refers to a phrase "such as but not limited to", and may be used therewith interchangeably.

It needs also to be noted that in the devices, apparatuses and methods of the present disclosure, various components or steps may be divided and/or re-combined. These divisions and/or re-combinations should be considered as equivalent solutions of the present disclosure.

The above description of the disclosed aspects is provided to enable any person skilled in the art to make or use the present disclosure. Various modifications to these aspects are obvious to those skilled in the art, and the general principles defined herein may be applied to other aspects without departing from the scope of the application. Therefore, the present disclosure is not intended to be limited to the aspects shown herein, but covers the broadest scope consistent with the principles and novel features disclosed herein.

The foregoing description has been presented for purposes of illustration and description. In addition, the description is not intended to limit the embodiments of the present disclosure to the forms disclosed herein. Although multiple example aspects and embodiments have been discussed as above, those skilled in the art will recognize certain variations, modifications, changes, additions and sub-combinations thereof.

What is claimed is:

1. A speech recognition method, comprising:
    obtaining a video stream and an audio stream within a preset time period, the video stream within the preset time period including a current frame image and a historical frame image before the current frame image, the audio stream within the preset time period including current frame audio and historical frame audio before the current frame audio;
    obtaining at least one first lip region of a user in the historical frame image, and determining a second lip region of the user in the current frame image based on the current frame image and the at least one first lip region;
    obtaining at least one first speech feature of the historical frame audio, and obtaining a second speech feature of the current frame audio based on the current frame audio and the at least one first speech feature, wherein the second lip region in the current frame image corresponds to the second speech feature;
    obtaining a phoneme probability distribution of the current frame according to the at least one first lip region, the second lip region, the at least one first speech feature and the second speech feature; and obtaining a speech recognition result of the current frame audio according to the phoneme probability distribution, wherein obtaining the phoneme probability distribution of the current frame according to the at least one first lip region, the second lip region, the at least one first speech feature and the second speech feature comprises:

extracting a first lip visual feature from the at least one first lip region, and extracting a second lip visual feature from the second lip region by processing input lip region picture through combination of a convolutional neural network and a pooling network;

matching the first lip visual feature with the first speech feature in a time dimension and performing feature fusion, and matching the second lip visual feature with the second speech feature in the time dimension and performing the feature fusion;

recognizing features which are obtained after the feature fusion; and obtaining the phoneme probability distribution of the current frame.

2. The method of claim 1, wherein before obtaining the video stream and the audio stream within the preset time period, the speech recognition method further comprises:

performing voice activity detection on a collected audio stream; and dividing the preset time period according to a result of the voice activity detection.

3. The method of claim 2, wherein dividing the preset time period according to the result of the voice activity detection comprises:

obtaining an initial time point of each audio stream in the collected audio stream and a termination time point corresponding to the initial time point from the result of the voice activity detection;

taking the initial time point as an initial moment of the preset time period; and taking the termination time point as a termination moment of the preset time period.

4. The method of claim 1, wherein determining the second lip region of the user in the current frame image based on the current frame image and the at least one first lip region comprises:

performing face detection on the current frame image, and locating a face region of the user;

performing lip detection on the face region of the user according to the at least one first lip region, and locating the second lip region of the user in the current frame image; and intercepting the second lip region from the current frame image.

5. The method of claim 4, wherein after intercepting the second lip region from the current frame image, the method further comprises:

interpolating a size of a picture of the second lip region to a specified size and then caching the picture of the second lip region.

6. The method of claim 1, wherein obtaining the second speech feature of the current frame audio based on the current frame audio and the at least one first speech feature is:

performing signal processing on the current frame audio to reduce noise in the current frame audio, then, performing feature extraction on the current frame audio according to the at least one first speech feature, and obtaining the second speech feature of the current frame audio.

7. The method of claim 1, wherein obtaining the speech recognition result of the current frame audio according to the phoneme probability distribution comprises:

performing recognition through a decoder according to the phoneme probability distribution, and obtaining the speech recognition result of the current frame audio.

8. A non-transitory computer-readable storage medium, comprising instructions, that when executed by a computer, cause the computer to:

obtain a video stream and an audio stream within a preset time period, the video stream within the preset time period including a current frame image and a historical frame image before the current frame image, the audio stream within the preset time period including current frame audio and historical frame audio before the current frame audio;

obtain at least one first lip region of a user in the historical frame image, and determining a second lip region of the user in the current frame image based on the current frame image and the at least one first lip region;

obtain at least one first speech feature of the historical frame audio, and obtaining a second speech feature of the current frame audio based on the current frame audio and the at least one first speech feature, wherein the second lip region in the current frame image corresponds to the second speech feature;

obtain a phoneme probability distribution of the current frame according to the at least one first lip region, the second lip region, the at least one first speech feature and the second speech feature; and obtain a speech recognition result of the current frame audio according to the phoneme probability distribution, wherein obtaining the phoneme probability distribution of the current frame according to the at least one first lip region, the second lip region, the at least one first speech feature and the second speech feature comprises:

extracting a first lip visual feature from the at least one first lip region, and extracting a second lip visual feature from the second lip region by processing input lip region picture through combination of a convolutional neural network and a pooling network;

matching the first lip visual feature with the first speech feature in a time dimension and performing feature fusion, and matching the second lip visual feature with the second speech feature in the time dimension and performing the feature fusion;

recognizing features which are obtained after the feature fusion; and obtaining the phoneme probability distribution of the current frame.

9. The non-transitory computer-readable storage medium of claim 8, further comprising instructions, when executed by the computer, cause the computer to:

perform voice activity detection on a collected audio stream; and divide the preset time period according to a result of the voice activity detection.

10. The non-transitory computer-readable storage medium of claim 9, further comprising instructions, when executed by the computer, cause the computer to:

obtain an initial time point of each audio stream in the collected audio stream and a termination time point corresponding to the initial time point from the result of the voice activity detection;

take the initial time point as an initial moment of the preset time period, and taking the termination time point as a termination moment of the preset time period.

11. The non-transitory computer-readable storage medium of claim 8, further comprising instruction, when executed by the computer, cause the computer to: :
perform face detection on the current frame image, and locating a face region of the user;
perform lip detection on the face region of the user according to the at least one first lip region, and locate the second lip region of the user in the current frame image;
intercept the second lip region from the current frame image.

12. The non-transitory computer-readable storage medium of claim 8, further comprising instruction, when executed by the computer, cause the computer to:
perform recognition through a decoder according to the phoneme probability distribution, and obtaining a speech recognition result of the current frame audio.

13. The non-transitory computer-readable storage medium of claim 8, further comprising instruction, when executed by the computer, cause the computer to:
extract a first lip visual feature from the at least one first lip region, and extracting a second lip visual feature from the second lip region;
match the first lip visual feature with the first speech feature in a time dimension and performing feature fusion, and matching the second lip visual feature with the second speech feature in the time dimension and performing the feature fusion;
recognize features which are obtained after the feature fusion, and obtaining the phoneme probability distribution of the current frame.

14. An electronic equipment, comprising:
a processor; and
a memory for storing instructions executable by the processor;
the processor being used for reading the executable instructions from the memory, and executing the instructions to implement a speech recognition method comprising:
obtaining a video stream and an audio stream within a preset time period, the video stream within the preset time period including a current frame image and a historical frame image before the current frame image, the audio stream within the preset time period including current frame audio and historical frame audio before the current frame audio;
obtaining at least one first lip region of a user in the historical frame image, and determining a second lip region of the user in the current frame image based on the current frame image and the at least one first lip region;
obtaining at least one first speech feature of the historical frame audio, and obtaining a second speech feature of the current frame audio based on the current frame audio and the at least one first speech feature, wherein the second lip region in the current frame image corresponds to the second speech feature;

obtaining a phoneme probability distribution of the current frame according to the at least one first lip region, the second lip region, the at least one first speech feature and the second speech feature; and
obtaining a speech recognition result of the current frame audio according to the phoneme probability distribution,
wherein obtaining the phoneme probability distribution of the current frame according to the at least one first lip region, the second lip region, the at least one first speech feature and the second speech feature comprises:
extracting a first lip visual feature from the at least one first lip region, and extracting a second lip visual feature from the second lip region by processing input lip region picture through combination of a convolutional neural network and a pooling network;
matching the first lip visual feature with the first speech feature in a time dimension and performing feature fusion, and matching the second lip visual feature with the second speech feature in the time dimension and performing the feature fusion;
recognizing features which are obtained after the feature fusion; and
obtaining the phoneme probability distribution of the current frame.

15. The electronic equipment of claim 14, wherein before obtaining the video stream and the audio stream within the preset time period, the speech recognition method further comprises:
performing voice activity detection on a collected audio stream; and
dividing the preset time period according to a result of the voice activity detection.

16. The electronic equipment of claim 15, wherein dividing the preset time period according to the result of the voice activity detection comprises:
obtaining an initial time point of each audio stream in the collected audio stream and a termination time point corresponding to the initial time point from the result of the voice activity detection;
taking the initial time point as an initial moment of the preset time period; and
taking the termination time point as a termination moment of the preset time period.

17. The electronic equipment of claim 14, wherein determining the second lip region of the user in the current frame image based on the current frame image and the at least one first lip region comprises:
performing face detection on the current frame image, and locating a face region of the user;
performing lip detection on the face region of the user according to the at least one first lip region, and locating a second lip region of the user in the current frame image; and
intercepting the second lip region from the current frame image.

18. The electronic equipment of claim 14, wherein obtaining the speech recognition result of the current frame audio according to the phoneme probability distribution comprises:
performing recognition through a decoder according to the phoneme probability distribution, and obtaining the speech recognition result of the current frame audio.

* * * * *